US008913646B2

(12) United States Patent
Schmit et al.

(10) Patent No.: US 8,913,646 B2
(45) Date of Patent: Dec. 16, 2014

(54) ADAPTIVE BANDWIDTH, MULTI-CHANNEL DIGITAL MODULATION

(75) Inventors: Thomas Schmit, Huntington, NY (US); Theodore A. White, Norwalk, CT (US)

(73) Assignee: Honeywell International Inc., Morristown, NJ (US)

( * ) Notice: Subject to any disclaimer, the term of this patent is extended or adjusted under 35 U.S.C. 154(b) by 1676 days.

(21) Appl. No.: 11/846,797

(22) Filed: Aug. 29, 2007

(65) Prior Publication Data
US 2009/0060002 A1 Mar. 5, 2009

(51) Int. Cl.
*H04B 1/713* (2011.01)
(52) U.S. Cl.
CPC .................................. *H04B 1/713* (2013.01)
USPC ..................... 375/135; 375/295; 375/E1.033
(58) Field of Classification Search
CPC . H04B 1/715; H04B 2001/7154; H04B 1/713
USPC ............. 375/260, E1.033, 132–137; 370/347
See application file for complete search history.

(56) References Cited

U.S. PATENT DOCUMENTS

| 7,006,706 | B2 | 2/2006 | Sobel et al. | |
|---|---|---|---|---|
| 7,050,479 | B1 * | 5/2006 | Kim | 375/132 |
| 7,079,847 | B2 | 7/2006 | Blair et al. | |
| 7,154,938 | B2 | 12/2006 | Cumeralto et al. | |
| 7,197,288 | B1 | 3/2007 | Ngan et al. | |
| 2002/0187799 | A1 * | 12/2002 | Haartsen | 455/509 |
| 2003/0174690 | A1 * | 9/2003 | Benveniste | 370/350 |
| 2004/0013166 | A1 * | 1/2004 | Goodings | 375/131 |
| 2005/0180314 | A1 * | 8/2005 | Webster et al. | 370/208 |
| 2006/0098761 | A1 * | 5/2006 | Leizerovich et al. | 375/303 |
| 2006/0221191 | A1 * | 10/2006 | Nonaka et al. | 348/207.1 |
| 2007/0165754 | A1 * | 7/2007 | Kiukkonen et al. | 375/346 |

OTHER PUBLICATIONS

Zyren, Jim. "A Closer Look at IEEE 802.11g" Mar. 2002, Intersil. Accessed Apr. 23, 2011 from http://www.microalcarria.com/descargas/documentos/Wireless/802.11g/A%20Closer%20Look%20at/02OIEEE/020802.11g.pdf.*
Lopelli, et al."System-Level Analysis of an Ultra-low Power, Low Data-Rate FHSS Transceiver", Technische Universiteit Eindoven, Mixed-Signal Microelectronics Group, Eindoven, Netherlands.

* cited by examiner

*Primary Examiner* — Shuwang Liu
*Assistant Examiner* — David S Huang
(74) *Attorney, Agent, or Firm* — Husch Blackwell LLP

(57) ABSTRACT

A wireless product for wireless communication is constructed for spread spectrum operation within a required channel bandwidth where an RF signal for transmission in the channel is divided into sub-channels, each of which is less than the minimum channel bandwidth permitted by FCC regulations in order to realize improved transmission characteristics and greater flexibility in transmission timing and synchronization. The wireless product includes a controller for controlling system operation. During operation, the RF signal portion is less than the minimum channel bandwidth required by said regulations thus dividing the channel bandwidth to form N sub-channels, and setting the bandwidth of the RF signal to be substantially equal to the sub-channel bandwidth. The RF signal portion being transmitted in each of the N sub-channels.

11 Claims, 4 Drawing Sheets

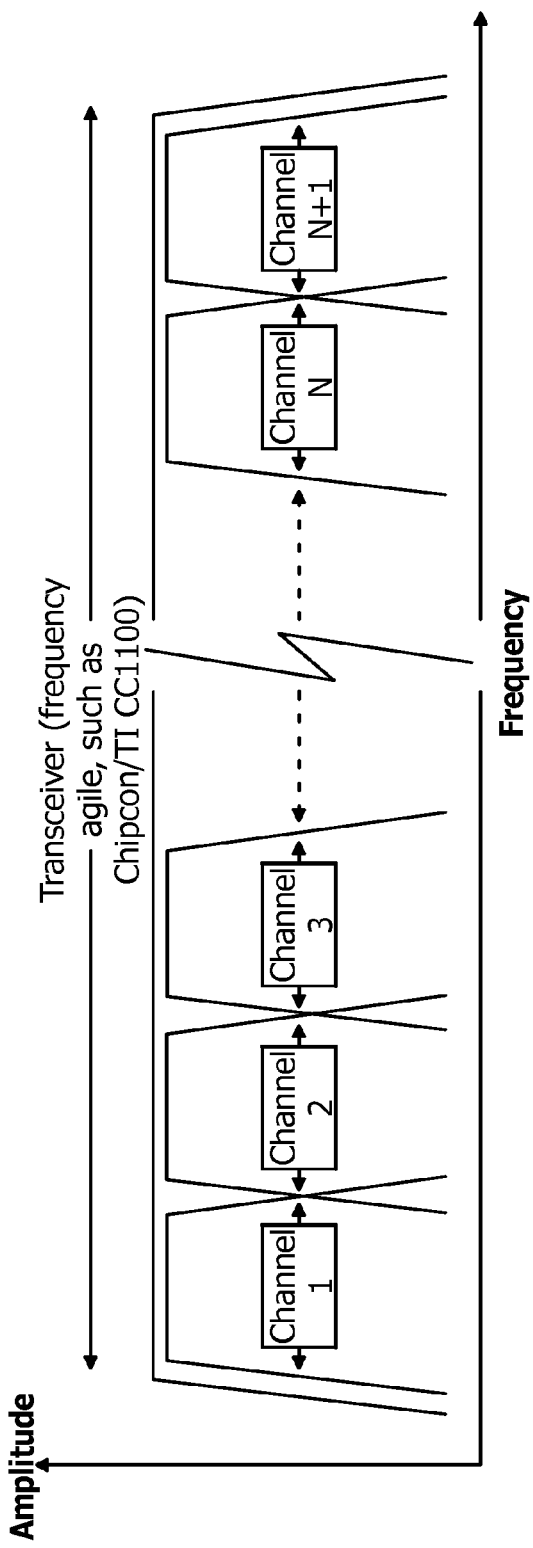
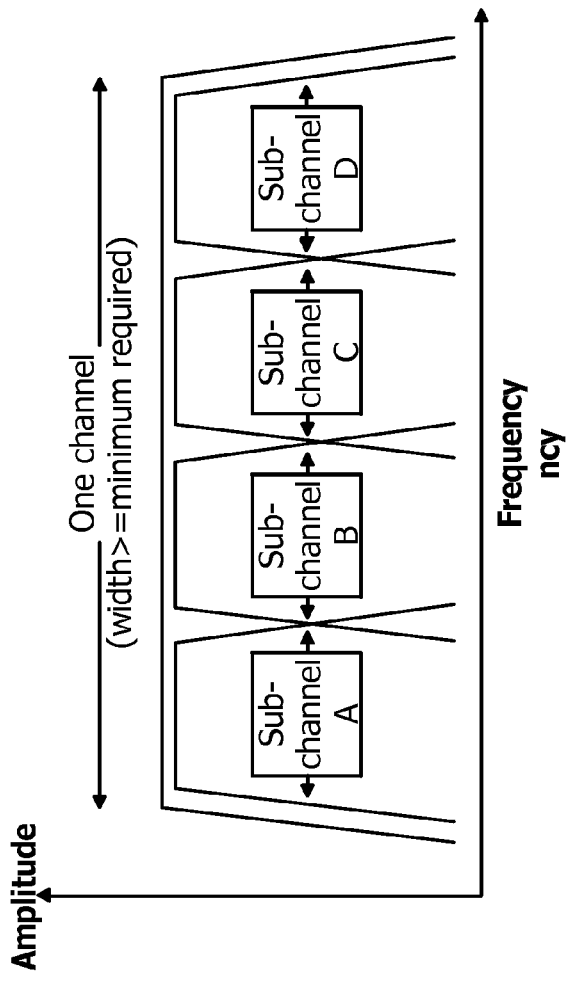

ADAPTIVE BANDWIDTH, MULTI-CHANNEL DIGITAL MODULATION

BACKGROUND OF THE INVENTION

The present invention relates to wireless products, and more particularly relates to an RF system capable of adapting its bandwidth as needed by the system even where the signal bandwidth is less than a minimum bandwidth requirement of 47 CFR §15.247 for spread spectrum operation.

RF communications systems are known for transmitting data from an endpoint device to a receiver or intermediate transceiver. Home security systems and related software application programs use such RE systems to communicate messages in a form of RF signals. For example, in one known RF system application, an RF message comprising a signal generated by a tripped sensor located at a window in a secure location may be communicated by an RF transceiver. The signal (RF message indicating the alarm event) is relayed by the RE transceiver to a central control, which in turn relay the RF message to a security-monitoring center. In another application, RF transceivers are used in medical applications to communicate (upload or download) acquired medical data via telemetry from an implantable medical device.

RF transceivers and related communications systems are also known to provide wireless links to communications networks, for example, RF communications to access an Internet Service Provider (ISP). In one such application, wireless ISPs (WISPS) provide Internet service to those customers that do not have access to cable or to high speed DSL (digital subscriber line) Internet service. The need for such a WISP occurs, for example, where the major cable service provider in the area of those customers has not laid the "last mile" of cable (or the telephone operating company does not provide DSL service) to the customer.

In 1985, as an attempt to stimulate the production and use of wireless network products, the FCC modified Part 15 of the radio spectrum regulation (as per 47 C.F.R.), which governs unlicensed radiating devices, which include RF transceivers. The modification to part 15 authorized wireless network products to operate in the industrial, scientific, and medical (ISM) bands using spread spectrum modulation. The ISM frequencies that may be used include 902 to 928 MHz, 2.4 to 2.4835 GHz, and 5.725 to 5.850 GHz. The FCC thereby allows users to operate wireless products, such as utility metering systems, without obtaining FCC licenses if the products meet certain requirements. This additional flexibility in the use of the frequency spectrum eliminates the need for the user organizations to perform costly and time-consuming frequency planning that would be necessary for coordinating radio installations in such a way that they maintain the standard so that their operation does not interfere with existing radio system transmissions, for example, between 902 and 928 MHz.

Spread spectrum modulators use one of two methods to spread the signal over a wider area. The first method is that of direct sequence spread spectrum, or DSSS, while the second is frequency hopping spread spectrum, or FHSS. DSSS has potentially higher data transmission rates but is more costly than FHSS to implement. DSSS consumes more power and is more susceptible to noise that FHSS. FHSS is more advantageous that DSSS by its ability to avoid using selected (narrowband) channels within the overall allocated frequency band.

DSSS combines a data signal at the sending station with a higher data rate bit sequence, creating what is sometimes referred to as a chipping code (also known as a processing gain). A high processing gain increases the signals resistance to interference. Source data to be transmitted is first exclusive OR-ed with a pseudorandom variable sequence, to enlarge the sequence of the baseband data signal (sequence) to be greater than the source data rate. When the exclusive OR-ed signal is modulated and transmitted, it occupies, and is said to be spread over, a proportionally wider frequency band that the original source data bandwidth. The baseband signal spread in this way appears as pseudo noise to other users of the same frequency band.

FHSS operates by dividing an allocated frequency band into a number channels. Each channel is typically of equal bandwidth, which is determined by the data bit rate and the modulation method used. A transmitter then uses each channel for a short period of time before moving (hopping) to a different channel. When a channel is being used, RF carrier is modulated with the bits being transmitted at that time (in that channel). The channel pattern of usage is known as the hopping sequence. The time spent transmitting within each channel is known as the dwell time.

FHSS relies on the distribution of an RF data signal randomly hopped across a number of defined frequency channels to avoid interference. The hopping sequence determines when and in which order the channels are used for transmission. To properly receive the RF signal, the receiver must follow the same hoping sequence and listen to the incoming signal at the right time and on the correct channel (frequency). If the system encounters interference on one frequency, then the signal (comprising the channel's intended transmission) is retransmitted on a subsequent hop on another frequency. Because of the nature of its modulation technique, FHSS can achieve up to 2 Mbps data rates. The data throughput, however, decreases as interference increases because data is lost and must be retransmitted.

In 2002, the FCC revised Part 15 of the radio spectrum regulation (47 CFR), to provide for the introduction of new digital transmission technologies, thereby creating a new category, called digital modulation, which replaces and subsumes the more limited direct sequence spread spectrum (DSSS) category. 47 CFR §15.247.d reads "[f]or digitally modulated systems, the peak power spectral density conducted from the intentional radiator shall not be greater than 8 dBm in any 3 kHz band during any time interval of continuous transmission." Paragraph 15.247.a.2 defines a digitally modulated system as one with a 6 dB bandwidth drop-off at least 500 kHz (wide).

The digital modulation systems are subject to the same power output maximum, which is 1 Watt and power spectral density limits of 8 dBm per 3 kHz, but without the same processing gain constraints as in the prior DSSS category.

These revisions provide an opportunity to improve the effectiveness of systems conforming to 47 CFR §15.247. For example, a wideband FSK transmitter (transceiver) with data spreading can now be used to transmit at power levels up to +12 dBm. This increased output power allows the wireless communication system and RF transceiver to perform better and with much lower cost and complexity than before the revisions. Both frequency hopping (FHSS) and direct sequence spread spectrum (DSSS), however, require the receiver to recover the transmitter's timing reference so that the receiver and transmitter are "in phase". This added complication makes these techniques more expensive, less power efficient, and more complicated to design. Other such opportunities exist and are the basis for the present invention.

SUMMARY OF THE INVENTION

To that end, the present invention provides an RF transmitter or transceiver, an RF communication system that includes the transmitter or transceiver, and spread spectrum transmission method that implement a novel adaptive bandwidth, multi-channel spread spectrum modulation that meets the constraints of 47 CFR §15.247 and exceeds or maximizes receive sensitivity reduced minimal power consumption.

The novel adaptive bandwidth, multi-channel (or sub-channels) modulation method allows the transmit bandwidth to be adjusted to match the bandwidth of the baseband RF signal even where that signal's bandwidth is less than the minimum bandwidth required by 47 CFR §15.247(a2), for example, where the bandwidth of the baseband signal for the channel is only 125 kHz.

The novel RF transmitter, RF transceiver, and RF spread spectrum communication system and method that implement the novel adaptive bandwidth, multi-channel modulation achieve the baseband matching by hopping across the multiple sub-bands within the minimum bandwidth required for digital modulation. For example, where a signal slated for transmission in a channel requires less than the minimum channel bandwidth required by FCC rules, the invention operates by allowing the bandwidth of the RF signal portion to be limited to the minimum needed while still meeting FCC requirements. The invention accomplishes this by transmitting an RF signal on narrower, multiple sub-channels within the required wider channel bandwidth. The present invention is sometime referred to as 'mini-hopping' since it emulates a less restrictive form of the FHSS approach within the constraints of the minimum required channel bandwidth.

As with digital modulation via wide band FM, this novel 'mini-hopping' approach has several advantages over conventional frequency hopping, or direct sequence multi-channel bandwidth approach, because the sequence, timing, and number of hops that it implements in a channel (the mini-hopping) are not constrained by part 15 of 47 CFR ("the standard") as long as the standard with respect to the channel for a particular hop is maintained. As a result of the lack of constraints within the channels (by the mini-hopping in the channel), frequency synchronization and control are greatly simplified. For example it would be less difficult and costly to implement the frequency synchronization and control at the MAC or even PHYSICAL layers, and in a way that is transparent to higher layers of the open systems interconnection (OSI) basic reference model.

Another advantage of the invention includes that in operation, the number of sub-channel hops required is typically less than 4 for most intended applications, so the RF signal only need be modulated in the four or less sub-channels.

Still another advantage of the novel spread spectrum mini-hopping RF transceiving operation includes that the frequency spread between sub-channel hops is reduced to the minimum in view of the standard.

Still another advantage lies in the invention's use for purposes of improved interference avoidance, where there are still many possible alternate digital modulation channels available in the allocations covered by 47 CFR §15.247, because the width of each channel is still maintained in accordance with the minimum bandwidth required by §15.247(a2).

Yet another advantage lies in the invention's interference avoidance ability, which is simplified with respect to conventional interference avoidance techniques (under the standard) because such interference avoidance hopping as provided by the invention need not be coordinated with the hopping sequence. That is, the novel mini-hopping occurs within the minimum channel bandwidth required. These channels may be continuously used as long as the channel's cumulative transmission meets the standard.

BRIEF DESCRIPTION OF THE DRAWING FIGURES

The foregoing and other objects, aspects and advantages will be better understood from the following detailed description of embodiments of the inventions, with reference to the drawings, in which:

FIG. 2a is a frequency vs. amplitude plot depicting a plurality of channels for conventional frequency hopping spread spectrum transceiving operation;

FIG. 2b is a frequency vs. amplitude plot depicting one channel of the channels shown in FIG. 2a, divided into four (4) sub-channels, within which the mini-hopping transceiving operation of the invention is implemented;

DETAILED DESCRIPTION OF THE INVENTION

The present invention is directed to a novel RF transceiver, novel RF transceiver operation including operation within wireless products that meet the constraints of 47 CFR §15.247 as applied to digital modulation, and in particular 47 CFR §15.247(a2), (b3), (b4), and (e). As discussed above, the Federal Communication Commission (FCC) requires that the power spectral density conducted from intentional radiators (comprising a wireless RF communication system) to the receiving antenna of a spread spectrum RF communication system receiver (or transceiver) shall not be greater than 8 dBm in any 3 kHz band during any time interval of continuous transmission (15 CFR §15.247(e)). Paragraph 15.247(a2) defines a digitally modulated system as one with a 6 dB bandwidth of at least 500 kHz.

Figure 1:
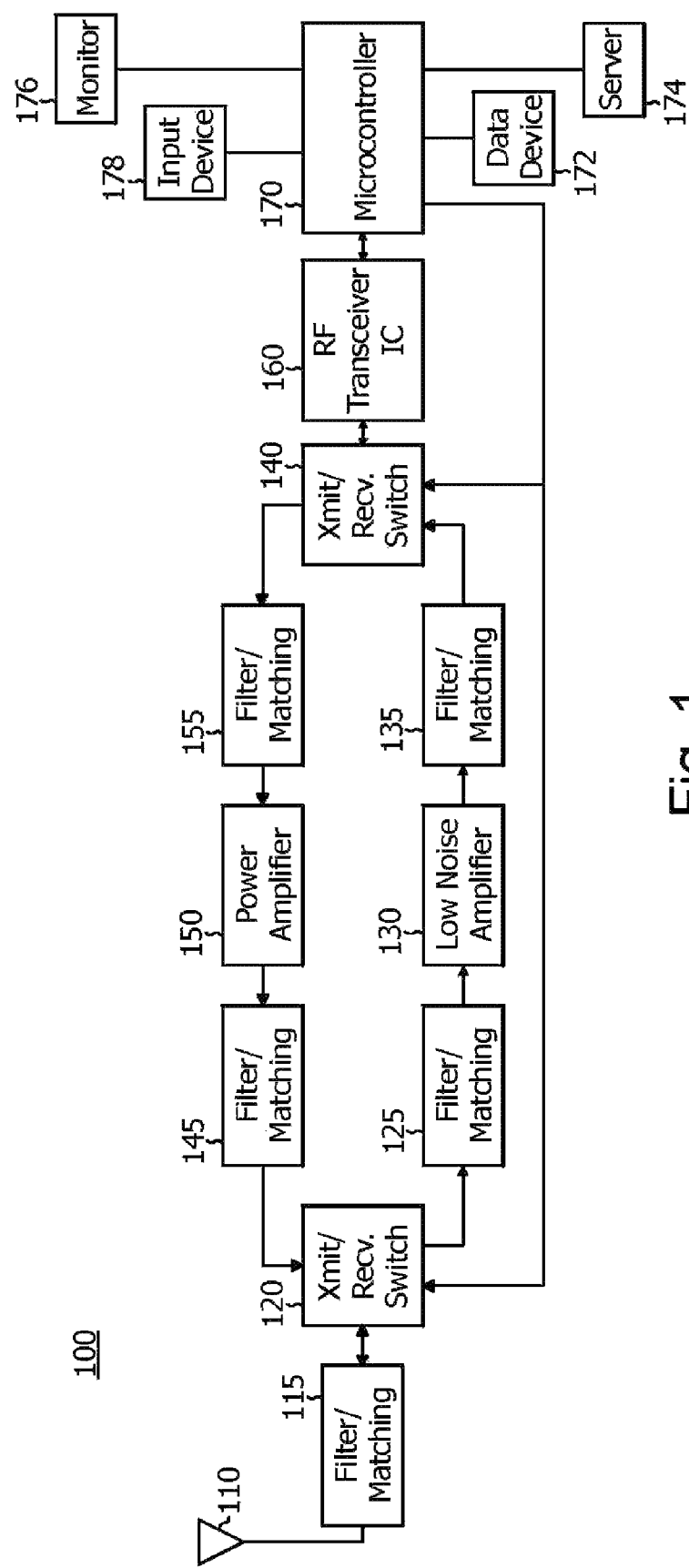
FIG. 1 is a system-level diagram of an RF transceiver with the mini-hopping ability of the invention.

FIG. 1 is a system-level diagram of an REF transceiver 100 with the mini-hopping ability of the invention, for the transmission of digital data using an RF signal. The RF transceiver 100 includes an antenna 110 for sending and receiving RF signals, the antenna 110 connected to a filter/matching circuit 115. Filter/matching circuit 115 is connected to a transmit/receive switch 120. Transmit/receive switch 120 is connected to a receive path including filter/matching circuit 125, low noise amplifier 130 and filter matching circuit 135, which is itself connected to a second transmit/receive switch 140. Transmit/receive switch 120 is also connected to the transmit path including a filter/matching circuit 145, power amplifier 150 and filter/matching circuit 155, which is itself is connected to the second transmit/receive switch 140.

The second transmit/receive switch 140 is connected to an RF transceiver integrated circuit (IC) 160, which RF transceiver IC is connected to a microcontroller 170 for controlling RF transceiver operation. The RF transceiver IC 160 is frequency agile, and may take the form of any IC device constructed to operate as a transceiver, such as CHIPCON/TI CC1100. RF transceiver IC may comprise any integrated circuit that may be arranged to provide the RF transceiver function known to those of skill in the art. Microcontroller 170 sets the RF transceiver's transmit bandwidth to be the same or less than the required bandwidth for a particular channel for spread spectrum operation. Microcontroller 170 controls the frequency of the information-carrying signal with a hopping signal in such a way that meets the power spectral density requirements of §15.247(e). It should be readily understood to the skilled practitioner that the inventive RF transceiver 100 is not limited to the structure shown in FIG. 1. For example, while microcontroller 170 is shown to be included with the RF transceiver 100, the operation provided by microcontroller 170 may be implemented though any known or available processor or system controller separate and distinct from the RF transceiver, but connected to control its operation as set forth herein without deviating from the scope and spirit of the invention.

If needed, the system processor or microcontroller 170 sets the center frequency of each sub-channel, and mini-hops on each of the sub-channels so that the operation meets both the required bandwidth of §15.247(a2) and the power spectral density of §15.247(e) for FHSS operation. As used herein, the term channel shall refer to the required bandwidth defined in §15.247(a2) (6 dB bandwidth of 500 (Hz), and the term sub-channel shall refer to the bandwidth that is required to send the baseband. This bandwidth may be the same as or less than the required bandwidth or channel bandwidth. When the entire bandwidth of channel is needed to send the baseband no sub-channels are required and the bandwidth used by the channel is the same as the required bandwidth, which conforms to 47 CFR §15.247. When less bandwidth is needed, the channel is divided into multiple sub-channels. The width of each sub-channel may be taken to be equal, which is determined by dividing the required bandwidth by an integer greater than 1 (typically 2, 3, or 4).

FIG. 2a herein highlights a number N+1 frequency channels that are required for operating conventionally using FHSS in accordance with 47 CFR §15.247. FIG. 2b shows one of the FIG. 2a channels arranged in 4 sub-channels, A, B, C and D, to highlight the novel mini-hopping spread spectrum operation. Since the bandwidth of the sub-channels is less than that of the minimum channel bandwidth, the center frequency of each of the N sub-channels is varied by the invention as a function of time (e.g., time multiplexed) to meet both the required minimum bandwidth of 47 CFR §15.247(a2), and the power spectral density of §15.247(e) with respect to the novel sub-channel and mini-hopping operation. That is, the transceiver bandwidth is reduced to match that of the sub-channel in order to optimize receive sensitivity and thus link margin.

The FHSS method that includes the novel mini-hopping will be generally implemented by a computer such as microcontroller 170 executing a sequence of program instructions for carrying out the steps of the method. The program instructions may be embodied in a computer program product comprising media storing the program instructions. Microcontroller 170 implements a general purpose processing system to execute the sequence of program product instructions, for example, by accessing a compact disc through a compact disc drive, or other data access device indicated broadly as data device 172. For that matter, the computer program product may be located on a remote system such as a server 174, coupled to the microcontroller 170 via a network interface, such as an Ethernet interface (not shown expressly). Monitor 176 and input device 178 are coupled to the microcontroller 170 to provide user interaction.

Figure 3:
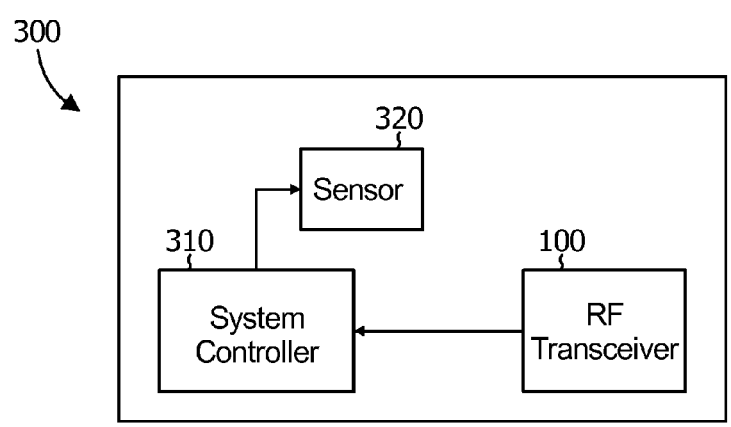
FIG. 3 is a system-level diagram of a wireless product (and RF communication system) that includes an RF transceiver constructed to implement the spread spectrum mini-hopping operation of the invention.

FIG. 3 herein depicts a wireless product 300 that operates as a wireless RF communications system through operation of novel RF transceiver 100 (FIG. 1) to implement the spread spectrum mini-hopping operation of the invention. The RF transceiver 100 included in wireless product 300 connected to a system controller 310, the system controller 310 connected to a sensor 320, such as a passive infrared detector (PIR) or other detection device. Upon the occurrence of an event that triggers the sensor 320, the system controller 310 compels the RF transceiver 100 to transmit a signal communicating the event, and/or other data. The RF transceiver may also receive signals, such as described above with respect to FIG. 1.

Wireless product 300 is constructed for mini-hopping spread spectrum operation within a channel's (required) bandwidth in accordance with the requirements of 47 CFR 15.247. The novel operation realizes an RF signal portion with an improved S/N ratio without increasing power output. System controller 310 controls the transceiving operation including the novel sub-channel mini-hopping operation. Such operation includes that where the baseband of the RF signal portion is less the channel bandwidth, the channel bandwidth is divided by an integer N to form N sub-channels. The bandwidth of the baseband signal is adapted to be substantially equal to the sub-channel bandwidth. The baseband RF signal portion is transmitted in each of the N sub-channels, whereby the entire channel bandwidth is used, maintaining the standard. The invention appears to be transmitting over the full channel bandwidth.

In one scheme for operating the invention, a channel within the 902-928 MHz range may be slated as a listening or rendezvous channel, for example, the first channel in the range between 902 MHz and. 902.5 MHz. When transceivers "wake" from battery-saving state, they would first look to the first channel for synchronization data.

Figure 4:
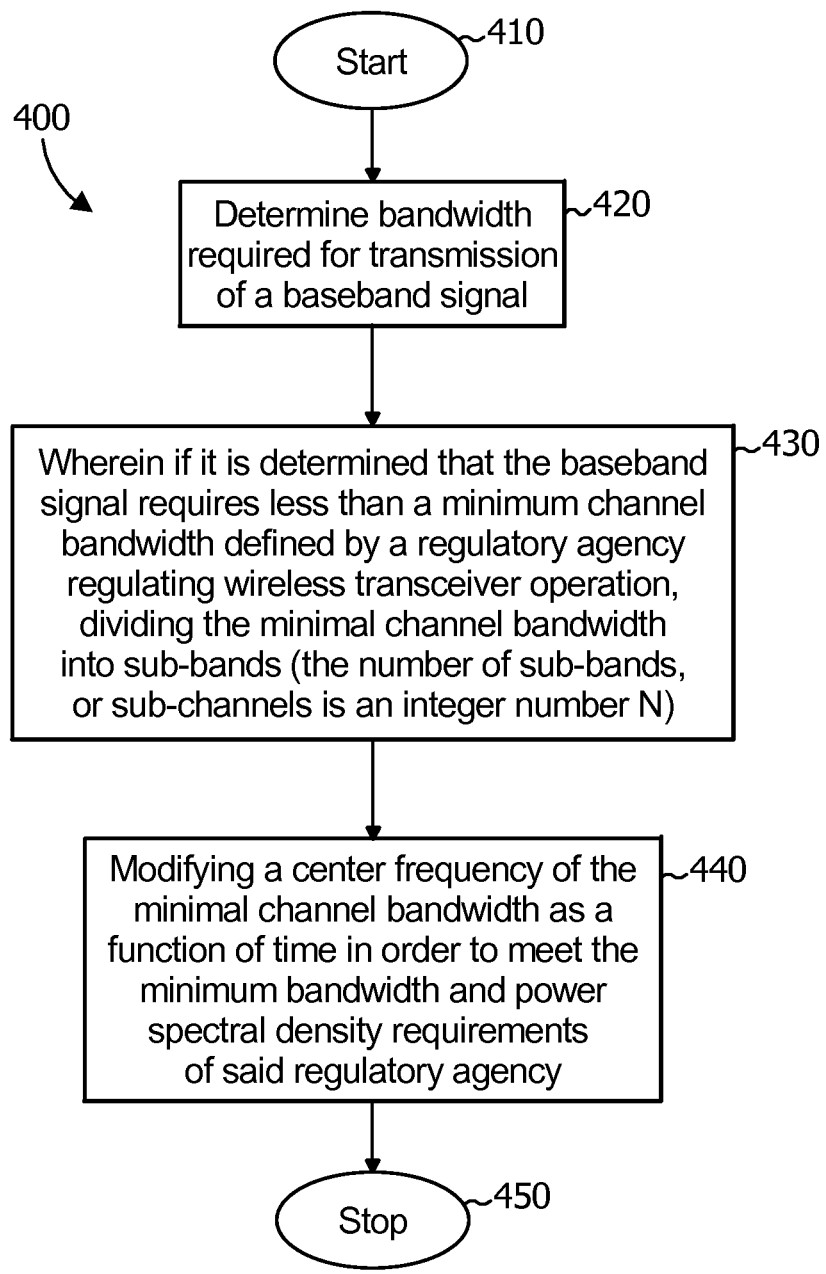
FIG. 4 is a flow diagram that depicts a method of spread spectrum signal transmission in accordance with the invention.

FIG. 4 is a flow diagram that depicts a method of spread spectrum signal transmission 400 in accordance with the invention. The method 400 comprises steps for operating a wireless transceiver in accord with 47 CFR 15.247. Box 410 represents a step of the start of transceiving operation, and box 420 represents a step of determining a bandwidth required for transmission of a baseband signal. Box 430 represents a step wherein if it is determined that the required baseband signal requires less than a minimum channel bandwidth defined by a regulatory agency regulating wireless transceiver operation, dividing the minimal channel bandwidth into sub-bands. The number of sub-bands, or sub-channels is an integer number N. Block 440 represents a step of modifying a center frequency of the minimal channel bandwidth as a function of time in order to meet the minimum bandwidth and power spectral density requirements of said regulatory agency. Block 450 represents a step of ending the method.

Method 400 may include that the step of modifying 400 includes that the function of time comprises time multiplexing. Method 400 may further include that the step of dividing into sub-bands includes dividing the minimum baseband by an integer of at least 2, and that the step of modifying includes reducing the bandwidth of the baseband to match the sub-band bandwidth.

As will be readily apparent to those skilled in the art, the present invention can be realized in hardware, software, or a combination of hardware and software. Any kind of computer/server system(s)—or other apparatus adapted for carrying out the methods described herein—is suited, as long as they are able to carry out the transmit and receive operation in accord with the invention, as does system processor 115. Computer program, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

While it is apparent that the invention herein disclosed is well calculated to fulfill the objects stated above, it will be appreciated that numerous modifications and embodiments may be devised by those skilled in the art and it is intended that the appended claims cover all such modifications and embodiments as fall within the true spirit and scope of the present invention.

What is claimed is:

1. A method for RF system operation, comprising the steps of:
   determining a bandwidth required for transmission of an RF signal portion;
   when the bandwidth required for transmission of the RF signal portion is less than 500 kHz, dividing a channel into multiple sub-channels, each sub-channel having a bandwidth less than 500 kHz, modulating the RF signal portion in each sub-channel by setting the bandwidth of the RF signal portion to the bandwidth of the sub-channels, varying the modulation as a function of time, and transmitting in the channel by mini-hopping (changing) between the sub-channels; and
   controlling the RF signal portion over time so that power spectral density is not greater than 8 dBm in any 3 kHz band during a time interval of continuous transmission,
   wherein the step of mini-hopping between sub-channels is executed in a sequence,
   wherein the function of time includes time multiplexing, and
   wherein setting the bandwidth of the RF signal portion to the bandwidth of the sub-channels includes reducing a bandwidth of a transceiver to be substantially equal to the bandwidth of the sub-channels.

2. The method as set forth in claim 1, further including a step of controlling and synchronizing channel selection by which the RF signal portion is modulated at a physical layer level.

3. The method as set forth in claim 1, further including a step of controlling and synchronizing channel selection by which the RF signal portion is modulated at a MAC layer level.

4. The method as set forth in claim 1, wherein the step of mini-hopping includes that a number and sequence of mini-hops can be changed dynamically to optimize system performance.

5. The method as set forth in claim 1, further including a step of switching between available channels in an allocated frequency range, where necessary, to avoid interference during system operation.

6. The method as set forth in claim 1, wherein the bandwidth of the channel is 500 kHz.

7. An RF system constructed for spread spectrum operation, comprising:
   executable program instructions stored on a non-transitory computer readable medium; and
   a controller that accesses and executes the executable program instructions stored on the non-transitory computer readable medium to control system operation, such that when a bandwidth of an RF signal portion is less than 500 kHz, the controller divides a channel to form at least two sub-channels, each sub-channel having a bandwidth less than 500 kHz, sets the bandwidth of the RF signal portion to be substantially equal to the sub-channel bandwidth, modulates the RF signal portion in the at least two sub-channels, varies the modulation as a function of time, and causes transmission of the RF signal portion in the at least two sub-channels,
   wherein the controller varies the RF signal portion over time so that power spectral density is not greater than 8 dBm in any 3 kHz band during a time interval of continuous transmission,
   wherein the function of time includes time multiplexing, and
   wherein setting the bandwidth of the RF signal portion to be substantially equal to the sub-channel bandwidth includes reducing a bandwidth of a transceiver to be substantially equal to the bandwidth of the sub-channels.

8. A wireless product for wireless communication constructed for spread spectrum operation, comprising:
   executable program instructions stored on a non-transitory computer readable medium; and
   a controller that accesses and executes the executable program instructions stored on the non-transitory computer medium readable medium to control system operation, such that when a bandwidth of an RF signal portion is less than a channel bandwidth, the controller divides the channel to form at least two sub-channels, each sub-channel having a bandwidth less than 500 kHz, sets the bandwidth of the RF signal portion to be substantially equal to the sub-channel bandwidth, modulates the RF signal portion in the at least two sub-channels, varies the modulation as a function of time, and causes transmission of the RF signal portion in the at least two sub-channels,
   wherein the controller varies the RF signal portion over time so that power spectral density is not greater than 8 dBm in any 3 kHz band during a time interval of continuous transmission,
   wherein the function of time includes time multiplexing, and
   wherein setting the bandwidth of the RF signal portion to be substantially equal to the sub-channel bandwidth includes reducing a bandwidth of a transceiver to be substantially equal to the bandwidth of the sub-channels.

9. A method for operating a wireless system comprising the steps of:
   determining a bandwidth required for transmission of a baseband signal;
   when the bandwidth required for transmission of the baseband in a channel is less than 500 kHz, dividing the channel into N sub-channels, selecting sub-channel frequencies of a carrier signal for the N sub-channels, modulating the baseband signal in the N sub-channels, each sub-channel having a bandwidth less than 500 kHz, varying the modulation as a function of time, and transmitting the baseband signal on the sub-channel frequencies, where N is an integer greater than one; and
   controlling the RF signal portion over time so that power spectral density is not greater than 8 dBm in any 3 kHz band during a time interval of continuous transmission,
   wherein the step of selecting includes reducing a bandwidth of a transceiver transmitting the baseband signal to be substantially equal to the bandwidth of the sub-channels, and
   wherein the function of time includes time multiplexing.

10. The method for operating a wireless system as set forth in claim 9, wherein the step of selecting includes time multiplexing.

11. The method for operating a wireless system as set forth in claim 9, wherein the step of dividing into N sub-channels includes dividing into at least two sub-channels.

\* \* \* \* \*